(12) United States Patent
Shibuya et al.

(10) Patent No.: US 12,008,499 B2
(45) Date of Patent: Jun. 11, 2024

(54) INFORMATION PROCESSING DEVICE, WORK PLANNING METHOD, AND STORAGE MEDIUM

(71) Applicant: FUJITSU LIMITED, Kawasaki (JP)

(72) Inventors: Toshiyuki Shibuya, Tama (JP); Daichi Shimada, Kawasaki (JP); Kenji Gotsubo, Yokohama (JP); Takafumi Anraku, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 113 days.

(21) Appl. No.: 17/691,166

(22) Filed: Mar. 10, 2022

(65) Prior Publication Data

US 2023/0015306 A1    Jan. 19, 2023

(30) Foreign Application Priority Data

Jul. 16, 2021    (JP) ................. 2021-117496

(51) Int. Cl.
*G06Q 10/0631*    (2023.01)
*G06Q 10/0633*    (2023.01)

(52) U.S. Cl.
CPC ... *G06Q 10/06316* (2013.01); *G06Q 10/0633* (2013.01)

(58) Field of Classification Search
CPC .......................................... G06Q 10/00–50/00
USPC ............................................... 705/7.11–7.42
See application file for complete search history.

(56) References Cited

U.S. PATENT DOCUMENTS

| | | | | |
|---|---|---|---|---|
| 5,177,688 A | * | 1/1993 | Rentschler ....... | G05B 19/41835 |
| | | | | 700/101 |
| 5,249,120 A | * | 9/1993 | Foley ................. | G06Q 10/0631 |
| | | | | 700/95 |
| 5,347,463 A | * | 9/1994 | Nakamura ....... | G05B 19/41835 |
| | | | | 700/226 |
| 5,630,070 A | * | 5/1997 | Dietrich ........... | G06Q 10/06313 |
| | | | | 705/7.23 |
| 6,198,980 B1 | * | 3/2001 | Costanza ......... | G05B 19/41865 |
| | | | | 700/99 |
| 6,341,240 B1 | * | 1/2002 | Bermon ................ | G06Q 10/06 |
| | | | | 700/97 |

(Continued)

FOREIGN PATENT DOCUMENTS

| | | |
|---|---|---|
| JP | H04-069137 A | 3/1992 |
| JP | 2000-317777 A | 11/2000 |

OTHER PUBLICATIONS

Matanachai, Sittichai, and Candace Arai Yano. "Balancing mixed-model assembly lines to reduce work overload." IIE transactions 33.1 (2001): 29-42. (Year: 2001).*

(Continued)

*Primary Examiner* — Alan S Miller
(74) *Attorney, Agent, or Firm* — Fujitsu Intellectual Property Center (57) ABSTRACT

A non-transitory computer-readable storage medium storing a work planning program that causes at least one computer to execute a process, the process includes dividing a plurality of objects into a plurality of groups according to a type of a constraint condition set to each of the plurality of objects, the constraint condition being related to an order in which the plurality of objects are worked in a work line; and acquiring an order of the plurality of objects in the work line so that the constraint condition is satisfied in each of the plurality of groups.

13 Claims, 11 Drawing Sheets

(56) References Cited

U.S. PATENT DOCUMENTS

| | | | | |
|---|---|---|---|---|
| 6,829,514 B2* | 12/2004 | Gyorfi | ............... | G06Q 10/06 |
| | | | | 700/99 |
| 6,862,487 B2* | 3/2005 | Yamanaka | ............ | B65G 37/02 |
| | | | | 700/112 |
| 8,494,893 B2* | 7/2013 | Oya | ............... | G06Q 10/087 |
| | | | | 705/7.26 |
| 8,548,838 B1* | 10/2013 | Ganesan | ......... | G06Q 10/06311 |
| | | | | 705/7.22 |
| 10,816,961 B2* | 10/2020 | Becher | ............... | G06Q 50/04 |
| 10,948,902 B2* | 3/2021 | Halaby Senerman | . | G06Q 10/06 |
| 11,054,811 B2* | 7/2021 | Akella | ............... | G06N 3/044 |
| 2003/0116339 A1* | 6/2003 | Suhara | ............... | H05K 13/02 |
| | | | | 174/535 |
| 2004/0143352 A1* | 7/2004 | Gyorfi | ............... | H05K 13/085 |
| | | | | 700/99 |
| 2004/0210467 A1* | 10/2004 | Yokoyama | ...... | G06Q 10/06316 |
| | | | | 705/7.26 |
| 2008/0077266 A1* | 3/2008 | Thierauf | ............ | G06Q 10/04 |
| | | | | 700/99 |
| 2009/0132319 A1* | 5/2009 | Saeed | ............... | G06Q 30/02 |
| | | | | 705/7.12 |
| 2009/0177305 A1* | 7/2009 | Falkenauer | ........... | G06Q 10/00 |
| | | | | 707/999.1 |
| 2018/0129192 A1* | 5/2018 | Murakami | ......... | G06Q 10/1091 |
| 2019/0049935 A1* | 2/2019 | Ikeda | ............... | H05K 13/00 |
| 2019/0228360 A1* | 7/2019 | Aoyama | .......... | G05B 19/41865 |
| 2019/0243347 A1* | 8/2019 | Kato | ............... | G06Q 10/06 |
| 2019/0286113 A1* | 9/2019 | Halaby Senerman | ...................... | |
| | | | | G06Q 10/063 |
| 2020/0019655 A1* | 1/2020 | Ikeda | ............... | G06Q 10/043 |
| 2020/0333760 A1* | 10/2020 | Hatakeyama | ....... | H05K 13/085 |
| 2022/0122006 A1* | 4/2022 | Ghosh | ............... | G06Q 10/04 |

OTHER PUBLICATIONS

Extended European Search Report dated Aug. 22, 2022 for corresponding European Patent Application No. 22162119.6, 9 pages.

* cited by examiner

```
PRODUCT 001, (1)
PRODUCT 002, (2)
PRODUCT 003, (1)
PRODUCT 004, (1)
PRODUCT 005, (1)
PRODUCT 006
PRODUCT 007
PRODUCT 008, (1), (2)
PRODUCT 009, (3)
PRODUCT 010, (2)
PRODUCT 011, (1), (2)
PRODUCT 012, (3)
```

FIG. 4B

CONSTRAINT CONDITION (1) : MANUFACTURE WITH ONE OR MORE INTERVALS
CONSTRAINT CONDITION (2) : MANUFACTURE WITH TWO OR MORE INTERVALS
CONSTRAINT CONDITION (3) : MANUFACTURE WITH FIVE OR MORE INTERVALS

PRODUCT WITH CONSTRAINT OF SIX INTERVALS

FIG. 10B

PRODUCT WITH CONSTRAINT OF SIX INTERVALS

STEP 1

T=

| NO CONSTRAINT CONDITION | CONSTRAINT CONDITION (1) | CONSTRAINT CONDITION (2) | CONSTRAINT CONDITION (3) | CONSTRAINT CONDITION (1), (2) |
|---|---|---|---|---|
| 0.17 | 0.33 | 0.17 | 0.17 | 0.17 |

FIG. 11B

STEP 2
STEP 3

| | NO CONSTRAINT CONDITION | CONSTRAINT CONDITION (1) | CONSTRAINT CONDITION (2) | CONSTRAINT CONDITION (3) | CONSTRAINT CONDITION (1), (2) |
|---|---|---|---|---|---|
| Z1= | 0.17 | 0.33 | 0.17 | 0.17 | 0.17 |
| Z2= | 0.34 | -0.34 | 0.34 | 0.34 | 0.34 |
| Z3= | -0.49 | -0.01 | 0.51 | 0.51 | 0.51 |
| | -0.32 | 0.32 | -0.32 | 0.68 | 0.68 |
| | -0.15 | 0.65 | -0.15 | -0.15 | 0.85 |
| | 0.02 | 0.98 | 0.02 | 0.02 | 0.02 |
| | 0.19 | 0.31 | 0.19 | 0.19 | 0.19 |

FIG. 11C

INFORMATION PROCESSING DEVICE, WORK PLANNING METHOD, AND STORAGE MEDIUM

CROSS-REFERENCE TO RELATED APPLICATION

This application is based upon and claims the benefit of priority of the prior Japanese Patent Application No. 2021-117496, filed on Jul. 16, 2021, the entire contents of which are incorporated herein by reference.

FIELD

This case relates to an information processing device, a work planning method, and a storage medium.

BACKGROUND

A technique for generating a loading order of a work object into a work line with a planning algorithm is required.

Japanese Laid-open Patent Publication No. 2000-317777 and Japanese Laid-open Patent Publication No. 04-069137 are disclosed as related art.

SUMMARY

According to an aspect of the embodiments, a non-transitory computer-readable storage medium storing a work planning program that causes at least one computer to execute a process, the process includes dividing a plurality of objects into a plurality of groups according to a type of a constraint condition set to each of the plurality of objects, the constraint condition being related to an order in which the plurality of objects are worked in a work line; and acquiring an order of the plurality of objects in the work line so that the constraint condition is satisfied in each of the plurality of groups.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In a multiproduct mixed flow work method, different types of products move on a work line. However, there is a problem in that, when a product flowing way is unbalanced, a load on an operator is unbalanced. Therefore, in the multiproduct mixed flow work method, it is desirable to plan a work order in consideration of constraint conditions regarding the order. However, as the constraint conditions become more complicated, it takes longer time to plan the work order.

In one aspect, an object of this case is to provide an information processing device, a work planning method, and a work planning program that can plan a work order in a short time.

A work order can be planned in a short time.

Figure 1:
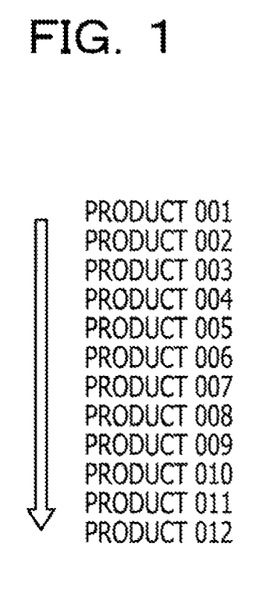
FIG. 1 is a diagram illustrating an order of products.

Prior to description of an embodiment, an outline of a work line with a multiproduct mixed flow work method will be described. In the multiproduct mixed flow work method, different types of products are sequentially loaded into a single work line in a predetermined order and sequentially move on the work line. Working is performed on each product according to the predetermined order. In the example in FIG. 1, 12 products having product numbers from 001 to 012 are loaded into the work line from the product with the product number 001. The products from the product 001 to the product 012 may include the same type of products and may include different types of products.

With the multiproduct mixed flow work method, an amount (lot) for working on the same type of products in one work line can be reduced, and a needed amount of work can be performed as needed. As a result, in a production line that is an example of the work line, an amount of wasteful stocks and interim products that are not worth as products can be reduced.

On the other hand, the multiproduct mixed flow work method has a problem in that, when the flowing way is unbalanced, the load on the operator is also unbalanced because different types of products flow on the work line at the same time. For example, when vehicles to which a sunroof is attached continuously flow on the work line, a person in charge of the sunroof continues to work without having a break time. In this case, there is a possibility that an operation error finally occurs and effects on the quality, cost, productivity, or the like increase.

Therefore, in the multiproduct mixed flow work method, it is desirable to plan a work order in consideration of a "constraint condition" such as "a specific type of product and a specific type of product are not sequentially loaded on a work line". The constraint condition here is a constraint condition regarding the order of the products flowing on the work line. In recent years, in order to increase an additional value, the types of products have varied, and this "constraint condition" has been complicated, and it has been difficult to plan the work order that satisfies the various and complicated "constraint conditions".

Figure 2:
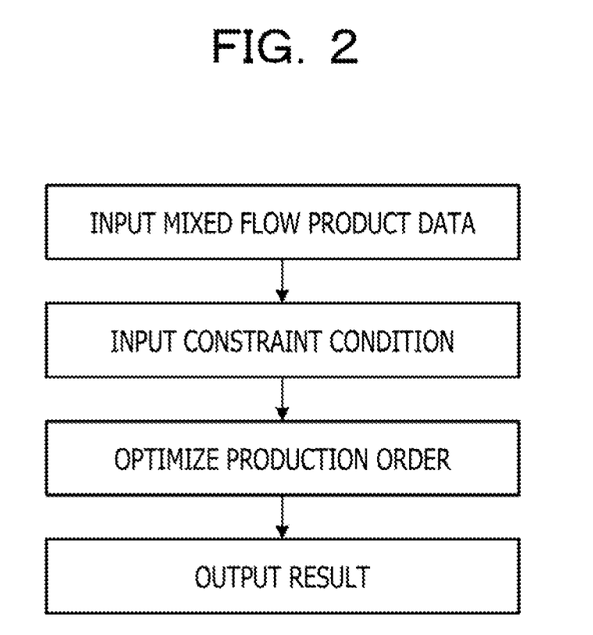
FIG. 2 is a diagram illustrating a solution method by a mathematical programming solver.

As a method for planning the work order in the multi-product mixed flow work method in consideration of the "constraint conditions", there is a method using a mathematical programming solver. FIG. 2 is a diagram illustrating a solution method by a mathematical programming solver. As illustrated ion FIG. 2, first, mixed flow product data is input to the mathematical programming solver. Next, constraint conditions set to each product are input to the mathematical programming solver. Next, the mathematical programming solver calculates a work order of each product so as to optimize the work order. Next, the mathematical programming solver outputs an optimization result.

This mathematical programming solver generally has a property that the mathematical programming solver can efficiently obtain a result with high quality for a small problem. However, in a case where the mathematical programming solver is applied to a site where operations are performed on a large number of products such as 100 to 10,000 pieces per day, there is no guarantee of obtaining a result within a realistic time period (for example, several minutes) that is needed to calculate a planning result. For example, there is a possibility that it is not possible to obtain the result before the work is started. Furthermore, a memory size required for the processing becomes enormous, and there is a case where it is not possible for a real computer to execute processing.

There is a method for improving a processing time through parallel processing, and the parallel processing has been already implemented in a commercially available mathematical programming solver. However, it is difficult for a current mathematical programming solver to achieve the object described above by improving the processing time several times. Furthermore, it is possible to stop optimization when a determined time period elapsed. However, decrease in the quality of the work order deteriorates the quality, the cost, the productivity, or the like.

In the following embodiment, the information processing device, the work planning method, and the work planning program that can plan a work order of each product in a work line in a short time will be described.

First Embodiment

Figure 3A:
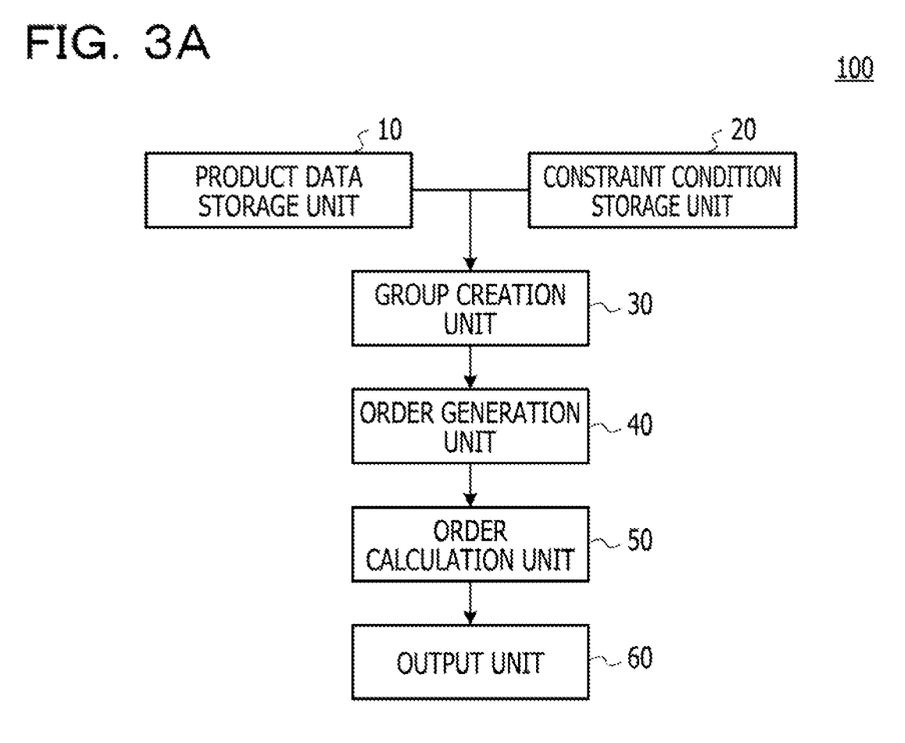
FIG. 3A is a block diagram illustrating an overall configuration of an information processing device.

FIG. 3A is a block diagram illustrating an overall configuration of an information processing device 100. As illustrated in FIG. 3A, the information processing device 100 includes a product data storage unit 10, a constraint condition storage unit 20, a group creation unit 30, an order generation unit 40, an order calculation unit 50, an output unit 60, and the like.

Figure 3B:
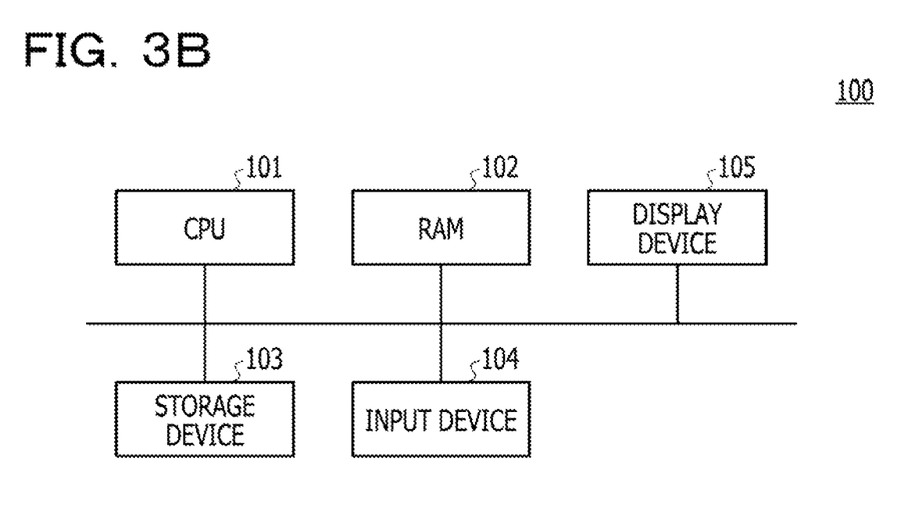
FIG. 3B is a block diagram illustrating a hardware configuration of the information processing device.

FIG. 3B is a block diagram illustrating a hardware configuration of the information processing device 100. As illustrated in FIG. 3B, the information processing device 100 includes a CPU 101, a RAM 102, a storage device 103, an input device 104, a display device 105, and the like.

The central processing unit (CPU) 101 is a central processing unit. The CPU 101 includes one or more cores. The random access memory (RAM) 102 is a volatile memory that temporarily stores a program to be executed by the CPU 101, data to be processed by the CPU 101, and the like. The storage device 103 is a nonvolatile storage device. For example, a read only memory (ROM), a solid state drive (SSD) such as a flash memory, a hard disk to be driven by a hard disk drive, or the like may be used as the storage device 103. The storage device 103 stores a work planning program. The input device 104 is an input device such as a keyboard or a mouse. The display device 105 is a display device such as a liquid crystal display (LCD). The CPU 101 executes the work planning program so as to implement the product data storage unit 10, the constraint condition storage unit 20, the group creation unit 30, the order generation unit 40, the order calculation unit 50, and the output unit 60. Note that, as the product data storage unit 10, the constraint condition storage unit 20, the group creation unit 30, the order generation unit 40, the order calculation unit 50, and the output unit 60, hardware such as a dedicated circuit may also be used.

Figure 4A:
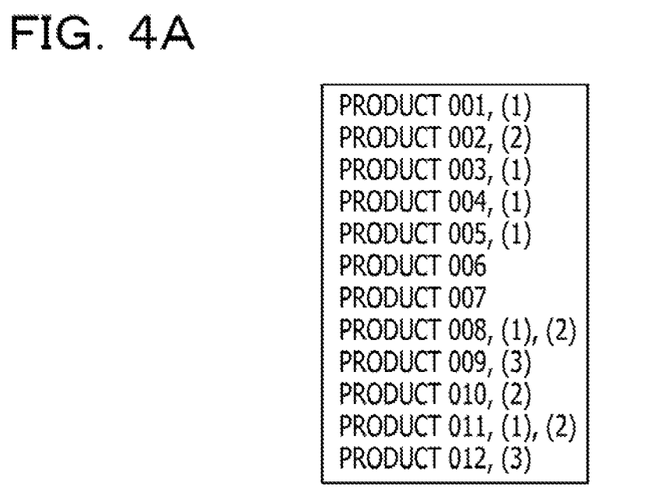
FIG. 4A is a diagram illustrating product data stored in a product data storage unit.

FIG. 4A is a diagram illustrating product data stored in the product data storage unit 10. The product data is stored in the product data storage unit 10 via the input device 104 or the like. As illustrated in FIG. 4A, the product data storage unit 10 stores a product number on which a work is performed in a work line and a constraint condition number in association with each other. An order from the top to the bottom indicates an initial loading order of each product into the work line. In the initial loading order in FIG. 4A, from a product 001 to a product 012 are loaded into the work line in a product number order. The products from the product 001 to the product 012 may include the same type of products and may include different types of products. The same work is performed on the same type of products. The same constraint conditions are set to the same type of products.

Figure 4B:
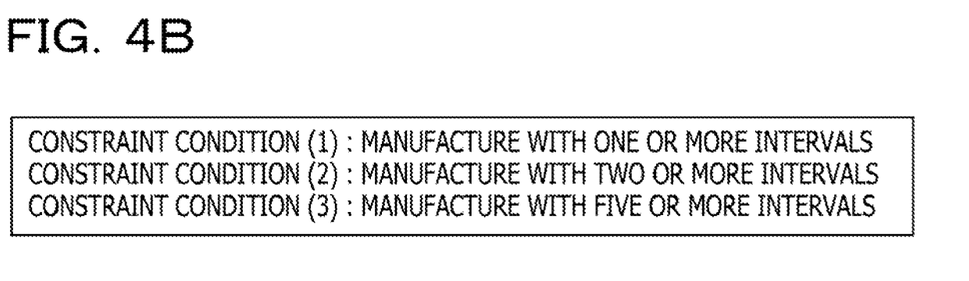
FIG. 4B is a diagram illustrating constraint conditions stored in a constraint condition storage unit.

FIG. 4B is a diagram illustrating constraint conditions stored in the constraint condition storage unit 20. The constraint conditions are stored in the constraint condition storage unit 20 via the input device 104 or the like. As illustrated in FIG. 4B, the constraint condition storage unit 20 stores three types of constraint conditions including to work at intervals of one or more other products (constraint condition 1), to work at intervals of two or more other products (constraint condition 2), and to work at intervals of five or more other products (constraint condition 3). For example, the constraint condition 1 is provided because painting of the same color is not continuously provided. The constraint condition 2 is provided because it is necessary to provide a certain interval since a large vehicle takes time to be assembled. The constraint condition 3 is provided because it is necessary to provide a large interval to distribute resources since optional processing such as a sunroof needs a large number of people. As illustrated in FIG. 4A, there is a case where one or more constraint conditions are set to each product or there is a case where no constraint condition is set to each product.

Figure 5A:
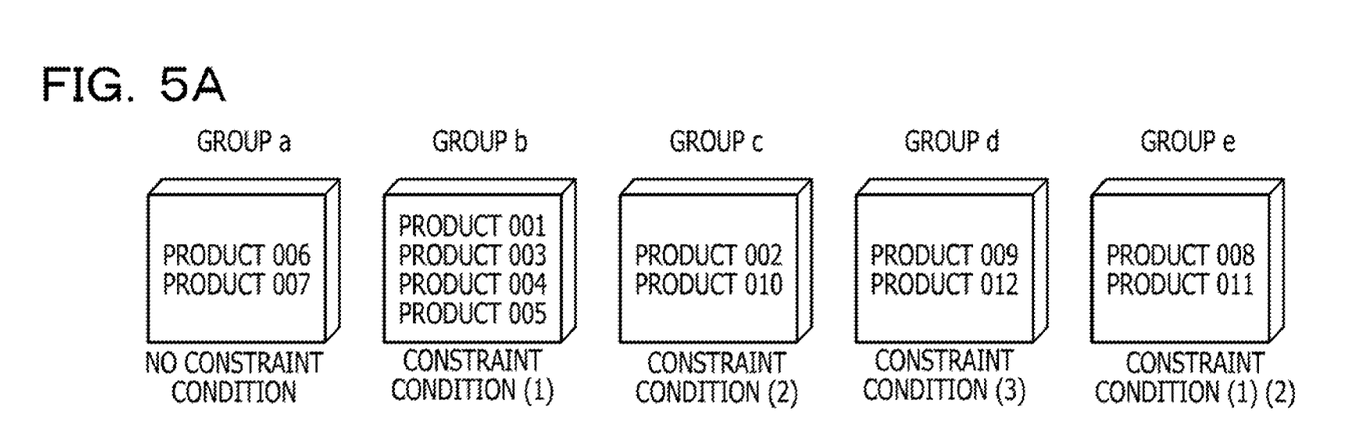
FIG. 5A is a diagram illustrating a label.

The group creation unit 30 assigns the same label to each product stored in the product data storage unit 10 to which the same type of constraint condition is set. For example, to each product, the group creation unit 30 assigns labels of a group a of products to which the constraint condition is not set, a group b of products to which only the constraint condition 1 is set, a group c of products to which only the constraint condition 2 is set, a group d of products to which only the constraint condition 3 is set, and a group e of products to which the constraint conditions 1 and 2 are set. In the example in FIG. 5A, for example, the label of the group a is assigned to the products 006 and 007, and the label of the group b is assigned to the products 001, 003, 004, and 005.

Figure 5B:
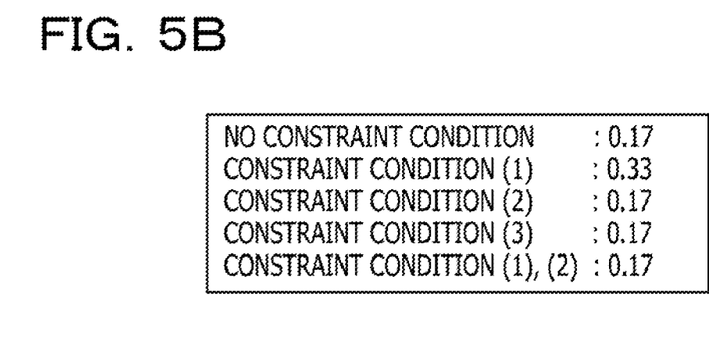
FIG. 5B is a diagram illustrating an appearance rate.

Next, the group creation unit 30 calculates a rate of the number of products with each label (appearance rate) with respect to the total number of products stored in the product data storage unit 10. For example, because the number of products to which the label of the group a is assigned is two while the total number of products is 12, as illustrated in FIG. 5B, an appearance rate of the number of products to which the label of the group a is assigned is 0.17. Because the number of products to which the label of the group b is assigned is four, an appearance rate of the number of products to which the label of the group b is assigned is 0.33.

Because the number of products to which the labels of the respective groups c to e are assigned is two, an appearance rate of the number of products to which the respective labels of the groups c to e are assigned is 0.17.

Next, the group creation unit 30 divides the products 001 to 012 into a plurality of groups in order to reduce unbalance of the label types using the calculated appearance rate. For example, the group creation unit 30 divides the products 001 to 012 into a plurality of groups so as to equalize the distribution of the types of the labels. The appearance rate=0.33 of the number of products to which the label of the group b is assigned is twice of the appearance rate=0.17 of the number of products to which the labels of the other groups a and c to e are assigned. Therefore, for example, the group creation unit 30 includes two products to which the label of the group b is assigned and one product to which each of the labels of the groups a and c to e is assigned in each of groups #1 and #2. The group #1 is a group which is loaded into the work line prior to the group #2. As an example, the group #1 includes the products 001, 002, 003, 006, 008, and 009. The group #2 includes the products 004, 005, 007, 010, 011, and 012.

Figure 6:
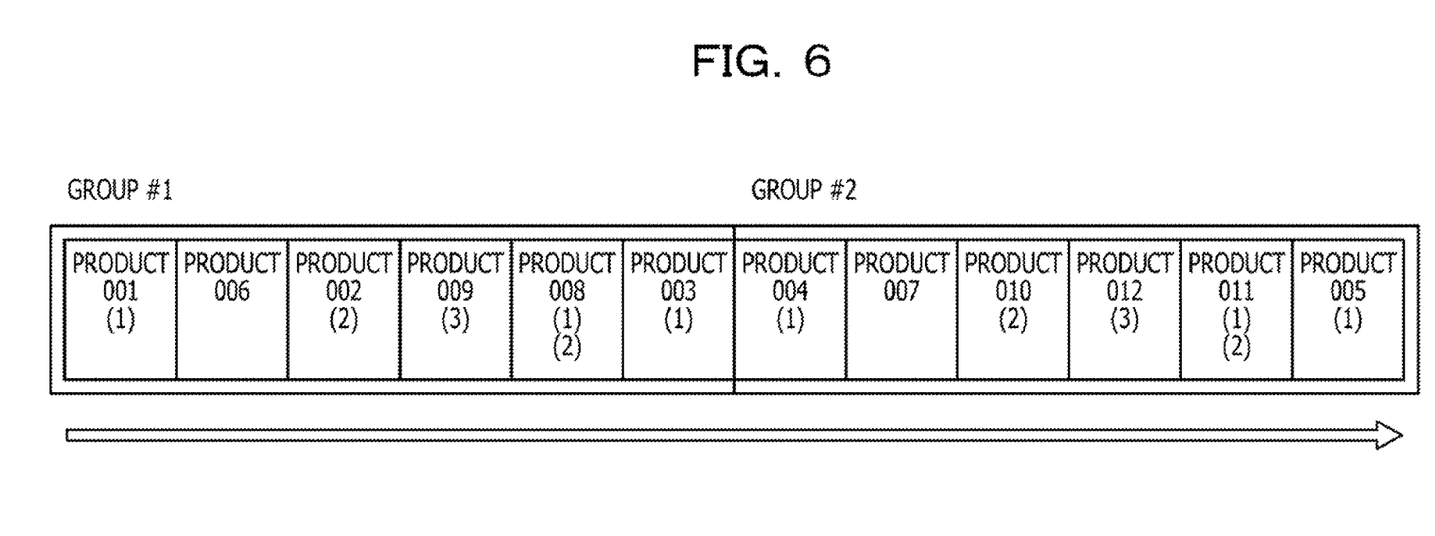
FIG. 6 is a diagram illustrating an order in a group.

Next, the order generation unit 40 determines an order so as to equalize the distribution of the constraint conditions in each of the groups #1 and #2. For example, as illustrated in FIG. 6, the order generation unit 40 rearranges the products in an order of the product 001, the product 006, the product 002, the product 009, the product 008, and the product 003 in the group #1. Furthermore, the order generation unit 40 rearranges the products in an order of the product 004, the product 007, the product 010, the product 012, the product 011, and the product 005 in the group #2. In this way, the product, to which only the constraint condition 1 is set, that belongs to the group b is the farthest, and the products in the other groups are arranged between the products in the group b and the other products in the group b.

Here, the constraint conditions of each product in the groups #1 and #2 are examined. The constraint condition 1 is set to the products 008, 003, and 004. However, another product is not sandwiched between the product 008 and the product 003, and another product is not sandwiched between the product 003 and the product 004. Therefore, the order in FIG. 6 does not satisfy the constraint condition 1. Furthermore, the constraint condition 2 is set to the products 002 and 008. However, two or more other products are not sandwiched between the products 002 and 008. Therefore, the order in FIG. 6 does not satisfy the constraint condition 2.

Therefore, the order calculation unit 50 performs optimization by calculating the order of the products so as to satisfy each constraint condition using the mathematical programming solver in each of the groups #1 and #2.

Here, the mathematical programming solver will be described.

First, it is assumed that only one product is a j-th product to be worked (the following formula (1)). Furthermore, a product i is worked only once (the following formula (2)). The reference $x_{i,j}$ means that the product i is the j-th product to be worked. Furthermore, $x_{i,j}$ is "0" or "1".

[Expression 1]

$$\sum_{j} x_{i,j} = 1 (\forall i) \quad (1)$$

[Expression 2]

$$\sum_{i} x_{i,j} = 1 (\forall j) \quad (2)$$

Next, conditions regarding intervals are determined as in the following formula (3). In the following formula (3), "M" represents a set of interval constraints m. The reference "$C_m$" represents a distance of an interval to be secured in the interval constraints m. The reference "$R_m$" represents a set of products to which the interval constraint m is applied.

[Expression 3]

$$|j1 - j2| \geq C_m x_{i1,j1} x_{i2,j2} \quad (3)$$
$$\forall (i1, i2) \in R_m, \forall (j1, j2), m \in M$$

Figure 7:
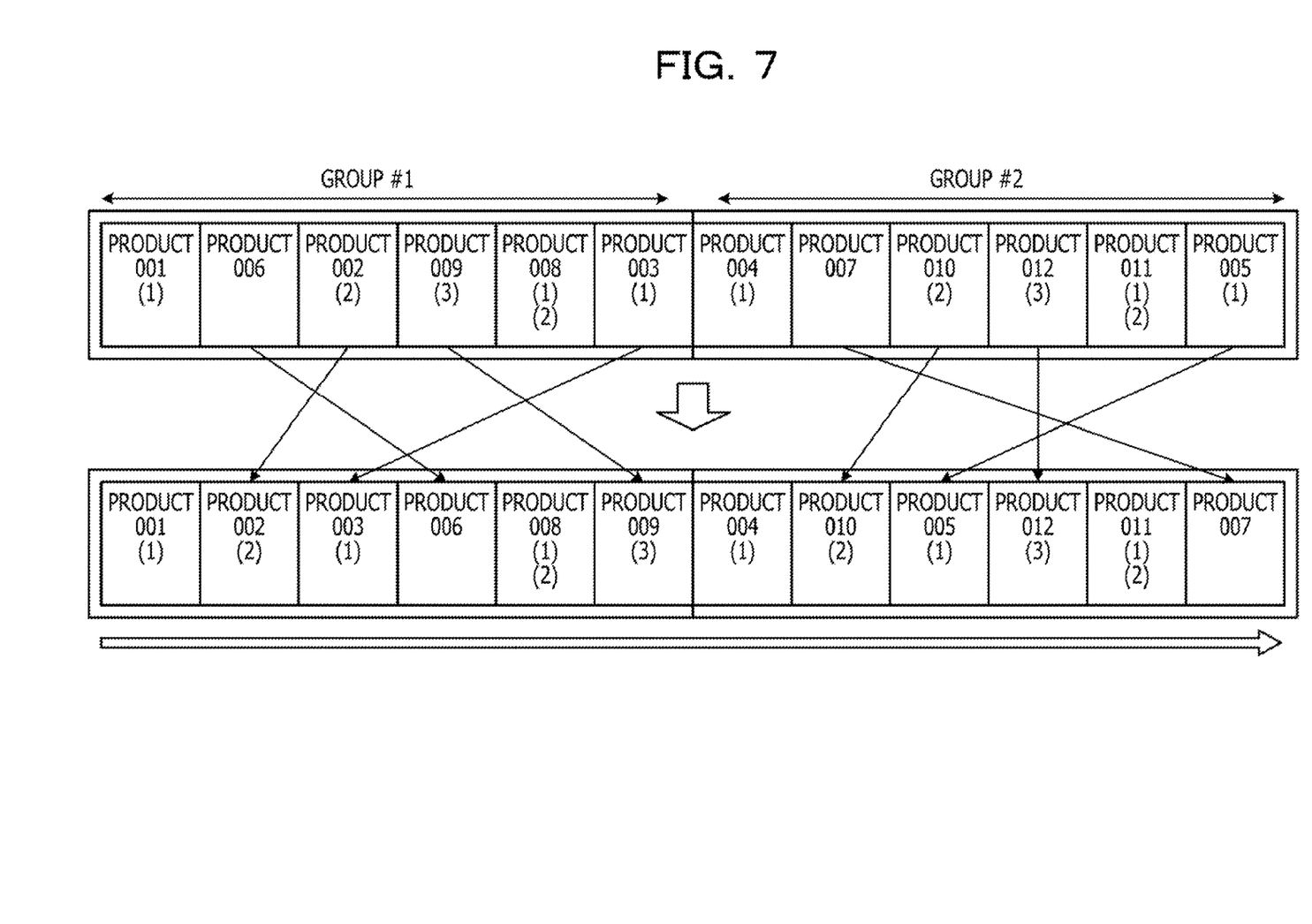
FIG. 7 is a diagram illustrating optimization.
Figure 8:
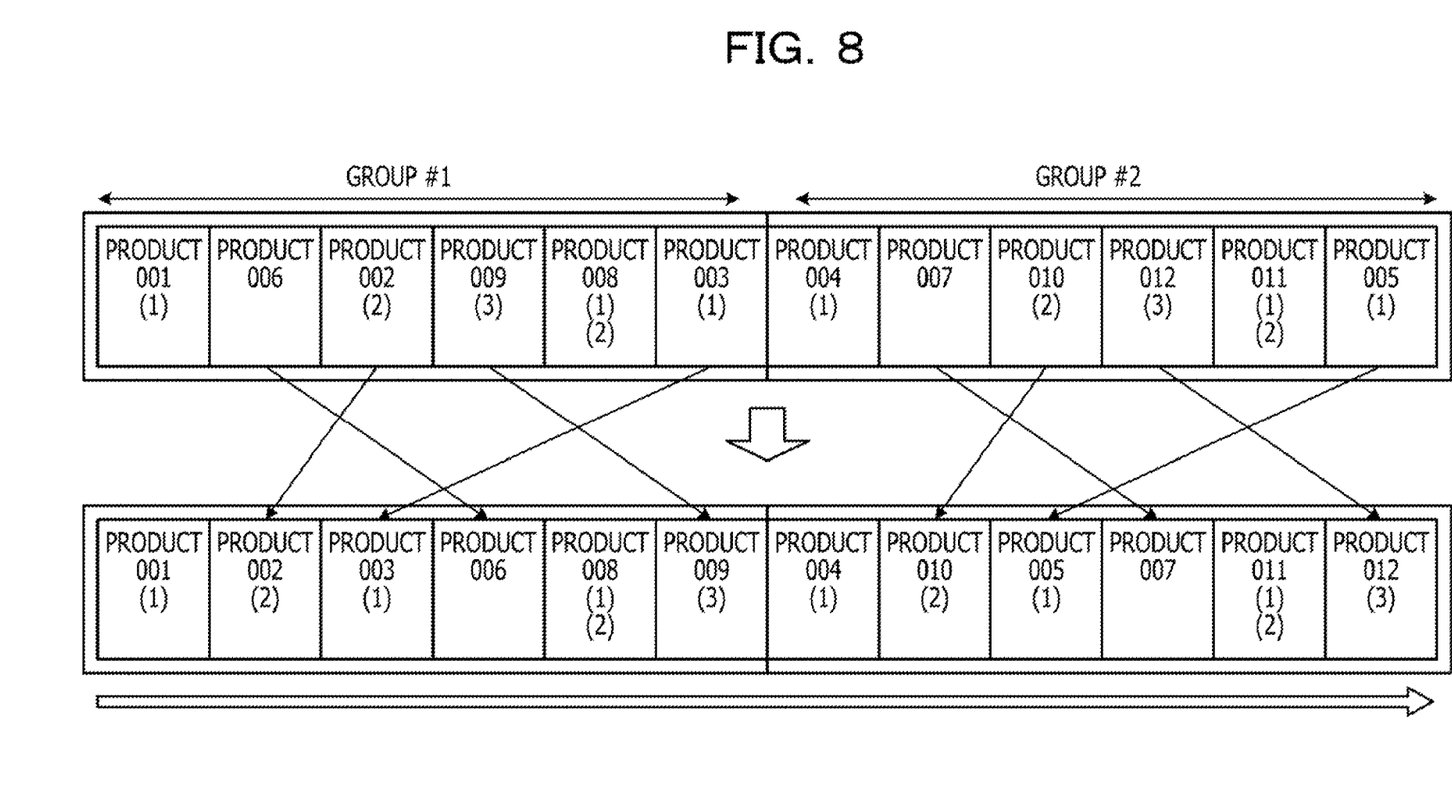
FIG. 8 is a diagram illustrating optimization.

FIG. 7 is a diagram illustrating optimization. In the result illustrated in FIG. 7, in each group, each of the constraint conditions (1) to (4) is satisfied. Next, the order calculation unit 50 determines whether or not the constraint conditions are satisfied between adjacent groups. In the example in FIG. 7, five or more other products are not sandwiched between the products 009 and 012. Therefore, the constraint condition 3 is not satisfied. Therefore, the order calculation unit 50 replaces the order of the products with another order so that each constraint condition is satisfied between the adjacent groups. In the example in FIG. 8, the constraint conditions are satisfied between the adjacent groups. Therefore, the output unit 60 outputs an optimization result in FIG. 8. For example, the result output from the output unit 60 is displayed on the display device 105.

Figure 9:
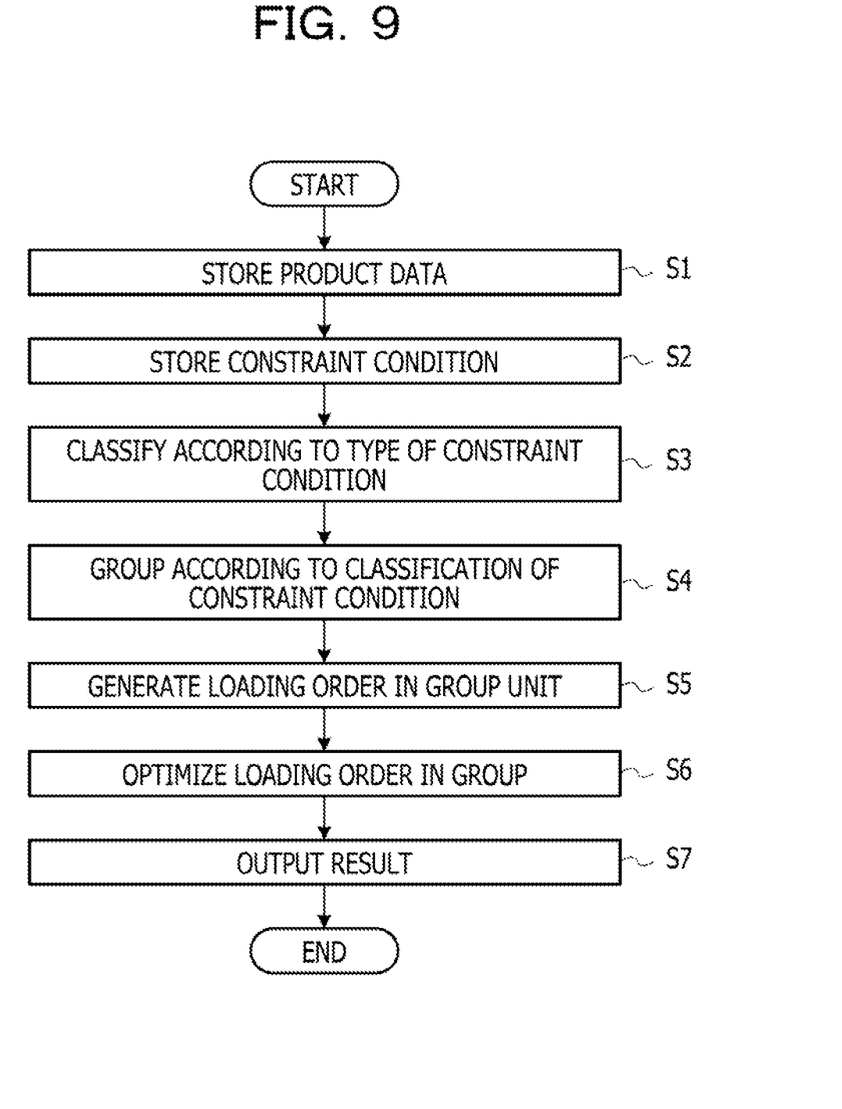
FIG. 9 is a diagram illustrating an operation of the information processing device as a flowchart.

FIG. 9 is a diagram illustrating an operation of the information processing device 100 described above as a flowchart. As illustrated in FIG. 9, the product data storage unit 10 stores the product data input via the input device 104 or the like (step S1). The product data is the data described with reference to FIG. 4A. Next, the constraint condition storage unit 20 stores the constraint conditions input via the input device 104 or the like (step S2). The constraint condition is the condition described with reference to FIG. 4B.

Next, the group creation unit 30 refers to the product data stored in the product data storage unit 10 and assigns the same label to products having the same type of constraint conditions (step S3). As a result, it is possible to perform classification according to the type of the constraint condition. For example, as described with reference to FIG. 5A, the group creation unit 30 assigns the label to each product.

Next, the group creation unit 30 groups each product according to the appearance rate of each group obtained in step S3 (step S4). As a result, it is possible to perform grouping according to the classification of the constraint conditions in step S3. For example, the group creation unit 30 groups each product according to the appearance rate described with reference to FIG. 5B.

Next, the order generation unit 40 generates a loading order of products in each group so as to equalize the distribution of the constraint conditions in each group obtained in step S4 (step S5). For example, the order generation unit 40 generates the loading order as described with reference to FIG. 6.

Next, the order calculation unit 50 performs optimization by calculating the order of the products so as to satisfy each constraint condition in each group (step S6). In this case, as described with reference to FIGS. 7 and 8, the order calculation unit 50 optimizes the order of the products so as to satisfy the constraint condition between the adjacent groups.

Figure 10A:
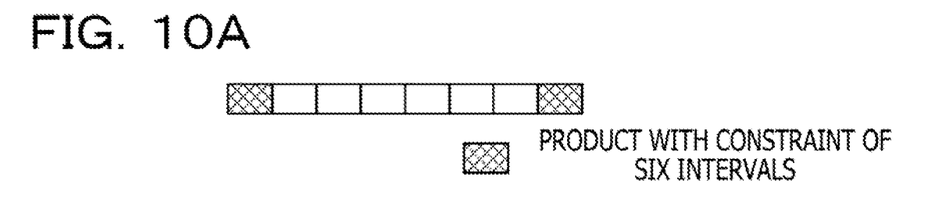
FIGS. 10A to 10C are diagrams for explaining details of a method for determining the number of groups.
Figure 10B:
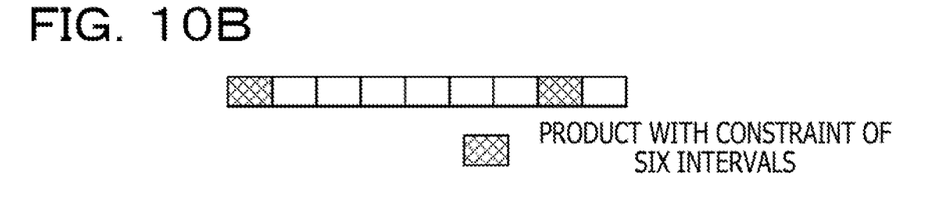

Here, details of a method for determining the number of groups in a case where the group creation unit 30 performs grouping in step S4 will be described. For example, the constraint conditions include a constraint that six intervals are provided between the products. In order to provide the six intervals between the products, as illustrated in FIG. 10A, it is necessary to include at least eight products in the group. However, when the number of products included in the group is set to eight, if two products, to which the constraint for providing six intervals is set, are accidentally included in the group, the corresponding two products are fixed at both ends. Therefore, by focusing on the maximum interval of each constraint condition, the number of products in each group is set to the maximum number of intervals+ 2+α (margin). The margin a is set to be equal to or more than one.

Figure 10C:
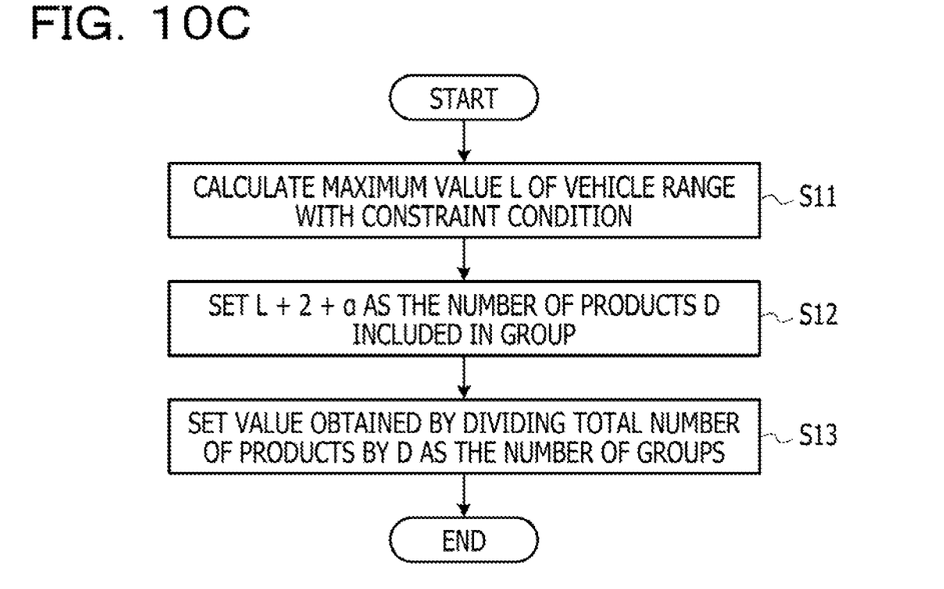

FIG. 10C is a flowchart illustrating an example of processing in a case where the group creation unit 30 calculates the number of groups when performing grouping in step S4. As illustrated in FIG. 10C, the group creation unit 30 acquires the maximum interval L of each constraint condition (step S11). Next, the group creation unit 30 sets L+2+α as the number of products D included in each group (step S12). Next, the group creation unit 30 sets a value obtained by dividing the total number of products included in the product data stored in the product data storage unit 10 by the number of products D as the number of groups (step S13). It is preferable that the number of products in each group be the same. However, in a case where there is a remainder when the total number of products is divided by the number of products D, the remainder may also be added to any one of the groups.

Next, details of a determination method in a case where the group creation unit 30 determines the product in the group in step S5 will be described. First, the group creation unit 30 assigns the same label to all products to which the same type of the constraint condition is set. For example, a set S of the labels is set as S={S1, S2, ..., SN}. The number of products to which each label Si is assigned is set as |Si|. An appearance probability T of the number of products to which each label is set is set as T=|Si|/B. Here, "B" is the total number of products.

Figure 11A:
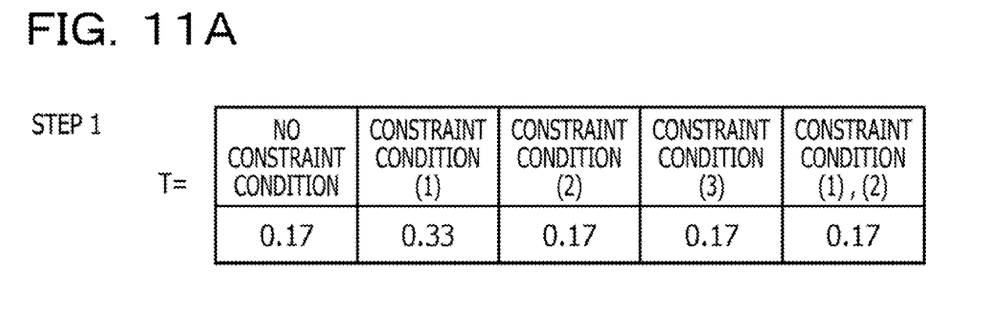
FIGS. 11A to 11C are diagrams for explaining details of a determination method in a case where a product in a group is determined.

The group creation unit 30 sets a set T of the appearance probability as T={|S1|/B, |S2|/B, ..., |SN|/B} (STEP 1). FIG. 11A is a diagram illustrating the appearance probability T.

Figure 11B:
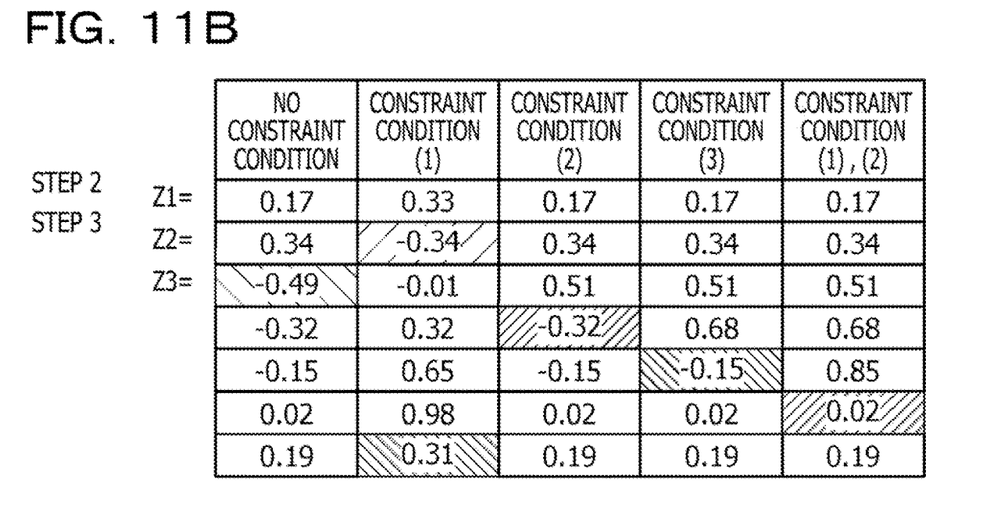
Figure 11C:
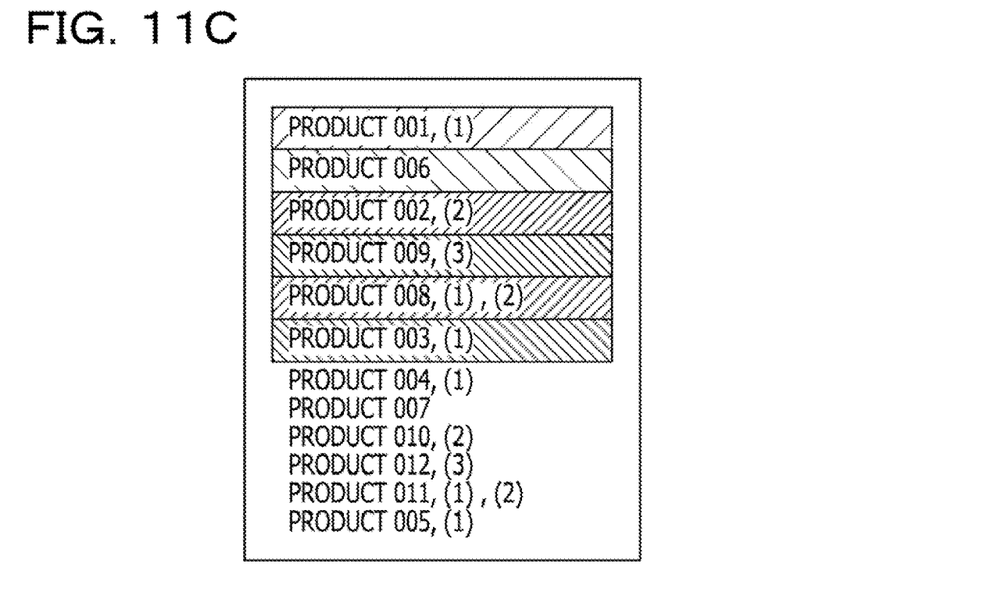

Next, as illustrated in FIG. 11B, the group creation unit 30 substitutes the appearance probability T into a cumulative appearance probability Z1 (STEP 2). Next, the group creation unit 30 calculates a cumulative appearance probability Z2 by adding the appearance probability T to the cumulative appearance probability Z1, allocates a type with the largest cumulative appearance probability to a slot, and subtracts one from that type of the cumulative appearance probability (STEP 3). In the example in FIG. 11B, the constraint condition (1) is "0.66" that is the maximum value, and "0.34" is obtained by subtracting "0.66" from one. As a result, as illustrated in FIG. 11C, the product 001 to which the constraint condition (1) is set is allocated to the first slot. According to the similar procedure, the appearance probability T is added to a cumulative appearance probability Z3. In this case, "no constraint condition" is "0.51" that is the maximum value, and "0.49" is obtained by subtracting "0.51" from one. As a result, as illustrated in FIG. 11C, the product 006 to which no constraint condition is set is allocated to the second slot. When the above procedure is repeated and there are no more products to be allocated, the processing ends.

According to the present embodiment, the products are divided into two or more groups according to the types of the constraint conditions set to each product. As a result, at the time of grouping, the type of the constraint condition is considered. Next, the loading order to the work line is calculated so that the constraint condition set to each product is satisfied in the group. As a result, the number of products in the group is less than the total number of products. As described above, because it is sufficient to calculate the loading order for the smaller number of products in each group in consideration of the constraint conditions, the work order of each product in the work line can be planned in a short time. For example, in a case where the mathematical programming solver is used, although an optimum solution can be calculated with high accuracy, there is a possibility that a calculation time increases. However, because it is sufficient to calculate the work order in each group in the present embodiment, the calculation time is shorter.

By satisfying the constraint condition between the adjacent groups when the loading order is calculated in the group, the work order of each product in the work line can be planned more accurately.

By assigning the same label to each object to which the same type of constraint condition is set and dividing the objects into the two or more groups so as to reduce the unbalance of the types of the labels between the two or more groups when the products are divided into the groups, conditions close to the optimal solution are satisfied. As a result, a time period needed to search for the optimum solution can be shortened.

Note that, in the embodiment described above, the interval in a case where working is performed on the same type of products has been described as the constraint condition. However, the present embodiment is not limited to this. Other constraint conditions regarding the order of the products flowing in the work line can be applied to the embodiment described above.

For example, a constraint condition that "up to two vehicles of the same type are allowed to be arranged in a row" is considered. This constraint condition is a constraint condition focusing on a situation in which it is desired to alternately arrange right-handle vehicles and left-handle vehicles, the number of right-handle vehicles is larger than the number of left-handle vehicles, and the right-handle vehicles are prevented from being sequentially arranged more than necessary.

Alternatively, it is assumed that four components be mounted on a carriage that shares components. Then, it is assumed that the number of large components that can be mounted on the carriage is three at the maximum and four small components can be mounted at the maximum. In this case, a constraint condition that "up to three vehicles of the same type are allowed to be arranged in a row" is considered. In that case, when this constraint is set to a vehicle to which the large component is mounted, up to four components can be constantly mounted on the carriage.

Alternatively, a constraint condition that "only three vehicles of the same type are allowed to be included in five continuous vehicles and it does not matter whether or not the three vehicles are continuous" is considered. This constraint condition is a constraint condition focusing on that overflowing of a shelf can be prevented in a case where only three parts for electric vehicles can be constantly placed on a parts shelf at the maximum.

In each example described above, the product is an example of an object to be worked in order in the work line. The group creation unit 30 is an example of a group creation unit that divides a plurality of objects into a plurality of groups according to the type of the constraint condition set to each of the plurality of objects. The order calculation unit 50 is an example of an order calculation unit that calculates an order of the objects so that the constraint condition set to each object is satisfied in the group.

Although the embodiment of the present invention has been described in detail thus far, the present invention is not limited to such specific embodiment and various modifications and alterations may be made within the scope of the present invention described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a work planning program that causes a computer, which is configured to perform work planning for a multiproduct mixed flow work using a mathematical programming solver, to execute a process, the process comprising:
    obtaining a plurality of objects from product data stored in a memory of the computer, each of the plurality of objects included in the product data being associated with one or more constraint conditions of a plurality of constraint conditions, each of the plurality of constraint conditions being a constraint condition related to an order in which the plurality of objects are worked in a work line of the multiproduct mixed flow work;
    dividing a plurality of objects into a plurality of groups by assigning, for each object of the plurality of objects, a label from among a plurality of labels based on a type of the one or more constraint conditions set to the object, each of the plurality of labels being a label classified to any one of the plurality of groups, each group of the plurality of groups including, among the plurality of objects, one or more objects each of which is assigned with a same label of the plurality of label;
    optimizing, for each group of the plurality of groups, an order of the one or more objects included in the group in the work line by using the mathematical programming solver so that each of the one or more constraint conditions common to the one or more objects included in the group is satisfied; and
    outputting an optimization result by using results obtained by the optimizing performed for each group of the plurality groups.

2. The non-transitory computer-readable storage medium according to claim 1, wherein the optimizing includes optimizing the order so that each constraint condition between adjacent groups is satisfied.

3. The non-transitory computer-readable storage medium according to claim 1, wherein the dividing includes:
    calculating, for each label of the plurality of labels, an appearance rate being a rate of a number of objects assigned with the label;
    dividing, based on the appearance rate of each label, the plurality of objects into the plurality of groups so as to reduce unbalance among the plurality of groups in the number of objects belonging to each group.

4. The non-transitory computer-readable storage medium according to claim 1, wherein the plurality of constraint conditions includes a condition that provides a predetermined interval between certain objects to which a same work is performed in the work line and that works one or more other objects during the predetermined interval between the certain objects.

5. The non-transitory computer-readable storage medium according to claim 1, wherein one of the plurality of constraint conditions is determined using a formula of:

$$|j1-j2| \geq C_m X_{i_1 j_1} X_{i_2 j_2}$$

$$\forall (i_1, i_2) \in R_m, \forall (j_1, j_2), m \in M \quad (3)$$

wherein M represents a set constraint m regarding an interval of the plurality of objects, Cm represents a distance of the interval to be followed in the m, and Rm represents a set of the plurality of objects to which the m is applied.

6. An information processing device configured to perform work planning for a multiproduct mixed flow work using a mathematical programming solver, the information processing device comprising:
    one or more memories; and
    one or more processors coupled to the one or more memories, the one or more processors being configured to perform processing including:
    obtaining a plurality of objects from product data stored in the one or more memories, each of the plurality of objects included in the product data being associated with one or more constraint conditions of a plurality of constraint conditions, each of the plurality of constraint conditions being a constraint condition related to an order in which the plurality of objects are worked in a work line of the multiproduct mixed flow work;
    dividing a plurality of objects into a plurality of groups by assigning, for each object of the plurality of objects, a label from among a plurality of labels based on a type of the one or more constraint conditions set to the object, each of the plurality of labels being a label classified to any one of the plurality of groups, each group of the plurality of groups including, among the plurality of objects, one or more objects each of which is assigned with a same label of the plurality of label;
    optimizing, for each group of the plurality of groups, an order of the one or more objects included in the group in the work line by using the mathematical programming solver so that each of the one or more constraint conditions common to the one or more objects included in the group is satisfied; and
    outputting an optimization result by using results obtained by the optimizing performed for each group of the plurality groups.

7. The information processing device according to claim 6, wherein the optimizing includes optimizing the order so that each constraint condition between adjacent groups is satisfied.

8. The information processing device according to claim 6, wherein the dividing includes:

calculating, for each label of the plurality of labels, an appearance rate being a rate of a number of objects assigned with the label, dividing, based on the appearance rate of each label, the plurality of objects into the plurality of groups so as to reduce unbalance among the plurality of groups in the number of objects belonging to each group.

9. The information processing device according to claim 6, wherein the plurality of constraint conditions includes a condition that provides a predetermined interval between certain objects to which a same work is performed in the work line and that works one or more other objects during the predetermined interval between the certain objects.

10. A work planning method implemented by a computer, which is configured to perform work planning for a multi-product mixed flow work using a mathematical programming solver, the work planning method comprising:

obtaining a plurality of objects from product data stored in a memory of the computer, each of the plurality of objects included in the product data being associated with one or more constraint conditions of a plurality of constraint conditions, each of the plurality of constraint conditions being a constraint condition related to an order in which the plurality of objects are worked in a work line of the multiproduct mixed flow work;

dividing a plurality of objects into a plurality of groups by assigning, for each object of the plurality of objects, a label from among a plurality of labels based on a type of the one or more constraint conditions set to the object, each of the plurality of labels being a label classified to any one of the plurality of groups, each group of the plurality of groups including, among the plurality of objects, one or more objects each of which is assigned with a same label of the plurality of label;

optimizing, for each group of the plurality of groups, an order of the one or more objects included in the group in the work line by using the mathematical programming solver so that each of the one or more constraint conditions common to the one or more objects included in the group is satisfied; and outputting an optimization result by using results obtained by the optimizing performed for each group of the plurality groups.

11. The work planning method according to claim 10, wherein optimizing includes optimizing the order so that each constraint condition between adjacent groups is satisfied.

12. The work planning method according to claim 10, wherein the dividing includes:

calculating, for each label of the plurality of labels, an appearance rate being a rate of a number of objects assigned with the label, dividing, based on the appearance rate of each label, the plurality of objects into the plurality of groups so as to reduce unbalance among the plurality of groups in the number of objects belonging to each group.

13. The work planning method according to claim 10, wherein the plurality of constraint conditions includes a condition that provides a predetermined interval between certain objects to which a same work is performed in the work line and that works one or more other objects during the predetermined interval between the certain objects.

* * * * *